P. & A. DE BOGORY.
SPRING WHEEL.
APPLICATION FILED JAN. 26, 1911.
1,037,602.
Patented Sept. 3, 1912.
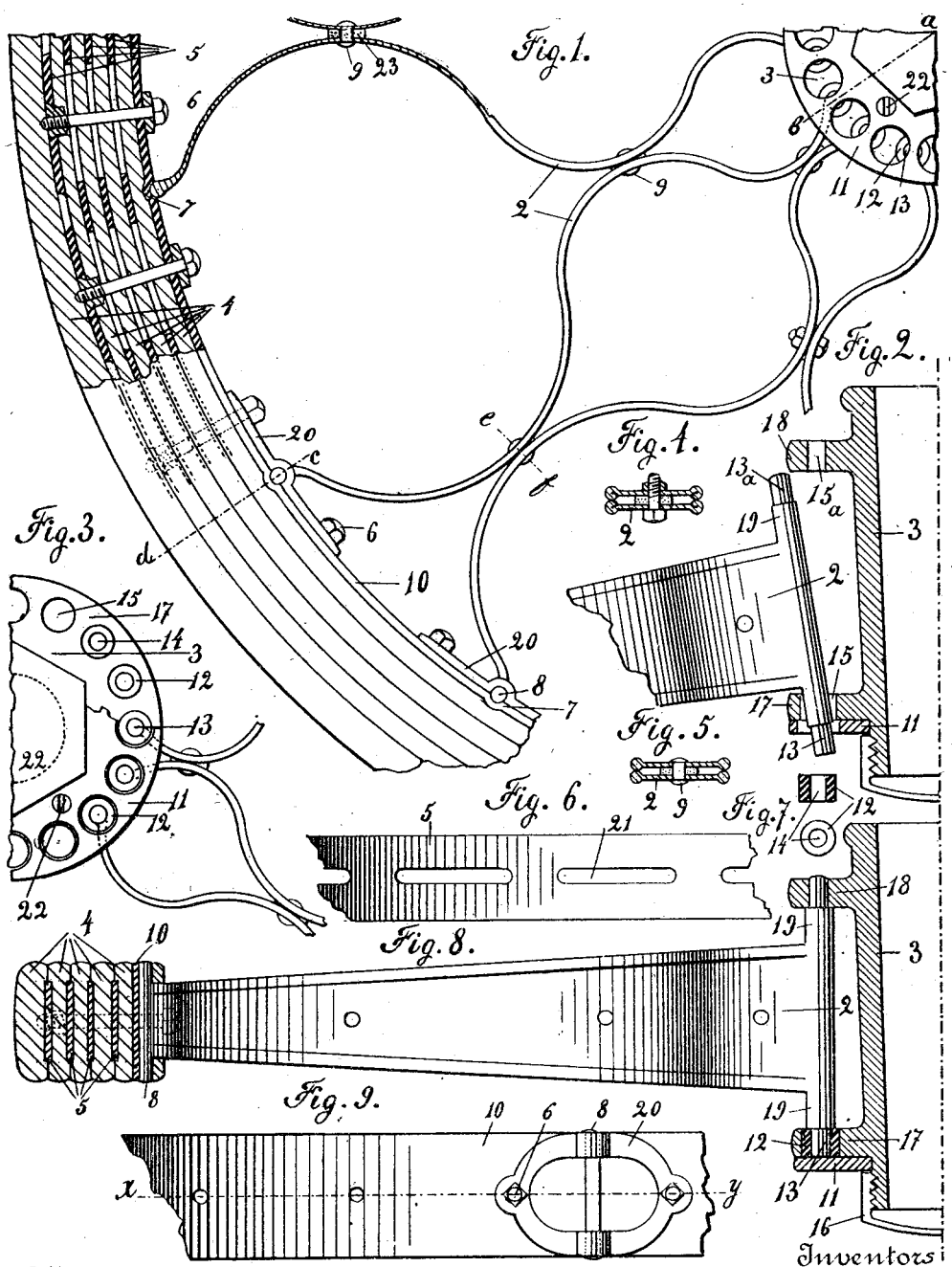

UNITED STATES PATENT OFFICE.

PROGOR DE BOGORY AND ALEXANDER DE BOGORY, OF COCOANUT GROVE, FLORIDA.

SPRING-WHEEL.

1,037,602.   Specification of Letters Patent.   Patented Sept. 3, 1912.

Application filed January 26, 1911. Serial No. 604,898.

*To all whom it may concern:*

Be it known that we, PROGOR DE BOGORY and ALEXANDER DE BOGORY, citizens of the United States, residing at Cocoanut Grove, in the county of Dade and State of Florida, have invented certain new and useful Improvements in Spring-Wheels, of which the following is a full and exact description, reference being had to the accompanying drawings.

Our invention relates to vehicle spring wheels, having resilient rim, flat spring spokes and a hub with two solid flanges on it.

The object of our invention is to construct a wheel, which will be resilient vertically and rigid laterally, and in case of breakage easy to repair.

In the accompanying drawing Figure 1 is a side elevation of a portion of our wheel, parts being shown in section; Fig. 2, a longitudinal section of the hub, with a portion of the spoke ready to be inserted between the flanges; Fig. 8, a longitudinal section of the hub, with a spoke inserted between the flanges; Fig. 3, a side elevation of a portion of the hub; Figs. 4, and 5 are cross sections of our spokes on line e, f, Fig. 1; Fig. 6, a portion of one of the inside springs 5, which are placed between the strips of belting 4, to reinforce the rim Fig. 1; Fig. 7, a longitudinal section and side elevation of the bushing, by means of which pins of the spokes are secured between the flanges of the hub; and Fig. 9, a view of a portion of spring from the inside of the rim (looking from the center of the wheel).

Similar letters refer to similar parts throughout the several views.

Practice shows that a wheel of that kind, to be resilient must have very thin spokes, which are easily dented at the edges and do not make a wheel rigid enough laterally; to avoid this difficulty and increase the lateral rigidity of the wheel:

I. We make our spokes very thin in the middle and thicker at the edges. Fig. 4 shows the spokes made out of flat strips of metal with their edges doubled. Fig. 5 represents a spoke made out of a strip of metal, which is thinner in the middle part of it than at the edges.

II. Spokes are made wider at the hub, than at the rim Fig. 8.

III. Each spoke is made in a combination of three distinct opposite curves, having such a shape, that when they are placed oppositely in the wheel,—each spoke will be touched and braced by adjoining spokes in three places, Fig. 1—where they may be fastened together, making the wheel still more rigid in lateral direction.

IIII. Pins which connect spokes to the hub are made extra long and stout, with shoulders projecting on each side of the spokes, and are welded, braced or riveted solid to the spokes, so that there is no chance for the spoke to get loose and shake on the connecting pin, Figs. 2 and 8.

We have adopted a resilient rim in our wheel and to make it perfectly safe in hard usage on rough roads we construct it out of the most tough material obtainable as: rubber belting, leather belting, or canvas belting, or some other tough material. We use several layers of this belting 4 in the construction of our rim and reinforce these belts with flat, thin metal springs 5, which are placed between each layer of belting as shown in Figs. 1 and 8. The belting and metal springs we prefer to be endless, but they could be used in sections if so desired.

Figs. 2 and 8, show that the hub of our wheel is provided with two solid flanges 17 and 18, with holes in them 15$^a$ and 15 to receive the pins of the spokes 13, one of these flanges 18, have the holes 15$^a$ of the same diameter, as the pins 13 have, which must be inserted in them—while the diameter of the holes 15, in the flange 17, are a great deal larger, than the diameter of the pins 13 and these large holes are fitted with bushings 12, Figs. 7 and 8, the inside diameter of which 14, just fit the pins 13. The hub is provided also with a disk 11, which is placed against the flange 17, Figs. 2 and 8.

Fig. 3— represents a side elevation of a portion of the hub, with a portion of the disk 11 broke off; and shows, that the disk 11 is provided with holes, which are slightly larger in diameter than the holes of the flange 17, but have common centers with them, so that the holes of the disk could be placed right against the holes of the flange Figs. 2 and 3, and in such position of the disk, bushing 12 can be inserted, or removed from the flange; when the bushing 12 is removed from the flange the spoke 2, also in a case of breakage, could be easily removed and a new one inserted between the flanges, as shown on the Fig. 2. When the spoke 2 is placed between the flanges, pin 13ᵃ will be in a hole 15ᵃ, and the pin 13 will be in a center of a large hole 15 to secure this pin in the center of the hole, bushing 12 must be inserted and the disk 11 moved so that the center of the holes of the disk 11 will be exactly between the centers of the holes of the flange Figs. 1 and 8. In such a position of the disk 11, bushing 12 will be locked in the hole 15 and the pins 13 and 13ᵃ of the spoke 2 will be securely held between the flanges 17 and 18. The disk 11 can be secured in that position by a set screw 22, Figs. 1 and 3.

Having thus fully described our invention, we claim:

1. A spring wheel comprising a resilient rim, a hub and a series of oppositely curved resilient spokes pivotally connected to said rim and hub, each of said resilient spokes formed from a flat strip of spring metal, and said flat strips of spring metal having edges thicker than the middle portion of said flat strips of spring metal, each spoke forms curves extending alternately in opposite directions, and said curves being of such a shape, that every said spoke, in the assembled wheel, touches adjacent spokes in three places, in said three places said spokes being fastened together.

2. A wheel of the character described comprising a resilient rim, a hub and a series of resilient spokes, said spokes having their edges thicker than the middle portion; said spokes, have pivotal connection to said hub and rim by means of pins, said pins being welded to each end of said spokes, and on the inner end of said spokes, said pins provided with shoulders projecting on each side of said spokes.

3. A wheel of the character described comprising a resilient rim, a two flanged hub, and series of resilient, oppositely curved spokes, said spokes being pivotally connected to said hub by the means of pins, and said two flanges of said hub having a series of holes to receive said pins of said spokes; half of said holes being of the same diameter as diameter of said pins to be engaged, the diameter of the other half of said holes being larger than the diameter of said pins, and in said holes with a larger diameter being provided bushings, said bushings having outside diameter to fit said large holes of said flange and said bushings have inside diameter to fit said pins of said spokes.

P. DE BOGORY.
A. DE BOGORY.

Witnesses:
A. A. Boggs,
Ellen O. Anderson.